United States Patent
Watanabe et al.

(10) Patent No.: US 9,806,308 B2
(45) Date of Patent: Oct. 31, 2017

(54) BATTERY MODULE

(71) Applicant: KABUSHIKI KAISHA TOYOTA JIDOSHOKKI, Aichi-ken (JP)

(72) Inventors: Shintaro Watanabe, Kariya (JP); Hidefumi Oishi, Kariya (JP); Takashi Sakai, Kariya (JP); Yuki Chujo, Kariya (JP); Hiromi Ueda, Kariya (JP); Naoto Morisaku, Kariya (JP); Kazuki Maeda, Kariya (JP); Takayuki Kato, Kariya (JP); Tomonori Sasaki, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 237 days.

(21) Appl. No.: 14/763,327

(22) PCT Filed: Jan. 31, 2014

(86) PCT No.: PCT/JP2014/052243
§ 371 (c)(1),
(2) Date: Jul. 24, 2015

(87) PCT Pub. No.: WO2014/119722
PCT Pub. Date: Aug. 7, 2014

(65) Prior Publication Data
US 2015/0349306 A1 Dec. 3, 2015

(30) Foreign Application Priority Data

Jan. 31, 2013 (JP) .................................. 2013-016793

(51) Int. Cl.
*H01M 2/12* (2006.01)
*H01M 2/04* (2006.01)
(Continued)

(52) U.S. Cl.
CPC ............... *H01M 2/12* (2013.01); *H01M 2/04* (2013.01); *H01M 2/1016* (2013.01);
(Continued)

(58) Field of Classification Search
CPC ............. H01M 10/425; H01M 10/617; H01M 10/6555; H01M 2/0217; H01M 2/04;
(Continued)

(56) References Cited

U.S. PATENT DOCUMENTS 6,444,353 B1 * 9/2002 Takaki ................ H01M 2/0247
429/120
2008/0090137 A1 * 4/2008 Buck ................... H01M 2/1077
429/120
(Continued)

FOREIGN PATENT DOCUMENTS

JP 2011-65749 3/2011
JP 2011-238544 11/2011
(Continued)

OTHER PUBLICATIONS

Official Action for CN Appl. No. 201480004911.X dated Aug. 24, 2016.
(Continued)

*Primary Examiner* — Carlos Barcena
(74) *Attorney, Agent, or Firm* — Greenblum & Bernstein, P.L.C.

(57) ABSTRACT

A battery module is provided and includes a plurality of rechargeable batteries and a battery cover, wherein the rechargeable batteries are disposed adjacent to each other, each of the rechargeable batteries has a battery case having a wall portion equipped with an open valve that is constructed so as to open when the inner pressure of the battery case rises up to a threshold value, and the battery cover faces the wall portion. The battery cover has a plurality of cover
(Continued)

members provided side by side in a direction toward which the rechargeable batteries are disposed adjacent to each other. The cover members include at least adjacent first and second cover members. The first cover member has a first edge portion and the second cover member has a second edge portion overlapped with the first edge portion.

6 Claims, 6 Drawing Sheets

(51) Int. Cl.
| | |
|---|---|
| *H01M 2/10* | (2006.01) |
| *H01M 2/20* | (2006.01) |
| *H01M 10/6555* | (2014.01) |
| *H01M 2/02* | (2006.01) |
| *H01M 10/42* | (2006.01) |
| *H01M 10/617* | (2014.01) |

(52) U.S. Cl.
CPC ....... *H01M 2/1241* (2013.01); *H01M 2/1252* (2013.01); *H01M 2/202* (2013.01); *H01M 10/6555* (2015.04); *H01M 2/0217* (2013.01); *H01M 10/425* (2013.01); *H01M 10/617* (2015.04)

(58) Field of Classification Search
CPC .... H01M 2/1016; H01M 2/12; H01M 2/1241; H01M 2/1252; H01M 2/202
See application file for complete search history.

(56) References Cited

U.S. PATENT DOCUMENTS

| | | | |
|---|---|---|---|
| 2009/0092891 A1* | 4/2009 | Kwag | ................... H01M 2/021 429/99 |
| 2012/0052355 A1* | 3/2012 | Chiang | ............... H01M 2/1066 429/96 |
| 2012/0064379 A1* | 3/2012 | Oguri | ................... H01M 2/1016 429/56 |
| 2012/0114987 A1* | 5/2012 | Kogure | ................... H01M 2/06 429/56 |
| 2012/0114993 A1 | 5/2012 | Park et al. | |
| 2013/0071721 A1 | 3/2013 | Ogasawara et al. | |
| 2013/0330579 A1 | 12/2013 | Ejiri et al. | |

FOREIGN PATENT DOCUMENTS

| | | | | |
|---|---|---|---|---|
| JP | 2012-104471 | | 5/2012 | |
| JP | 2012-164598 | | 8/2012 | |
| JP | 2012243608 A | * | 12/2012 | ............. H01M 2/20 |
| JP | 2013-37986 | | 2/2013 | |
| JP | 2013-80618 | | 5/2013 | |
| WO | 2012/131837 | | 10/2012 | |

OTHER PUBLICATIONS

Preliminary Report on Patentability for PCT/JP2014/052243 dated Aug. 4, 2015.
Written Opinion of the International Searching Authority (English-language translation) for PCT/JP2014/052243 dated Apr. 22, 2014.
International Search Report for PCT/JP2014/052243 dated Apr. 22, 2014.

* cited by examiner

US 9,806,308 B2

BATTERY MODULE

TECHNICAL FIELD

The present invention relates to a battery module in which rechargeable batteries having release valves are arranged side by side.

BACKGROUND ART

Patent Document 1 discloses one example of a battery module including a plurality of rechargeable batteries. The battery module disclosed in Patent Document 1 accommodates a plurality of rechargeable batteries in a housing. Each rechargeable battery includes an exhaust member that opens at a set pressure.

PRIOR ART DOCUMENT

Patent Document

Patent Document 1: Japanese Laid-Open Patent Publication No. 2012-104471

SUMMARY OF THE INVENTION

Problems that the Invention is to Solve

When the internal pressure of a rechargeable battery reaches a set pressure, the exhaust member opens. This allows the contents of the rechargeable battery (e.g., in a lithium-ion rechargeable battery, mainly solvent of an electrolyte solution or gas into which lithium salt is decomposed or vaporized) to be emitted from the rechargeable battery as emissions.

It is an object of the present invention to provide a battery module that is capable of limiting the diffusion of emissions.

Means for Solving the Problem

A battery module that solves the problem includes a plurality of rechargeable batteries arranged side by side. Each of the rechargeable batteries includes a battery case. The battery case includes a wall having a release valve configured to open when an internal pressure of the battery case increases to a threshold value. The battery module also includes a battery cover opposed to the wall. The battery cover includes a plurality of cover members arranged side by side in a layout direction of the plurality of rechargeable batteries. The plurality of cover members include at least a first cover member and a second cover member that are adjacent to each other. The first cover member includes a first edge. The second cover member includes a second edge that overlaps the first edge.

EMBODIMENT OF THE INVENTION

One embodiment of a battery module will now be described.

Figure 1:
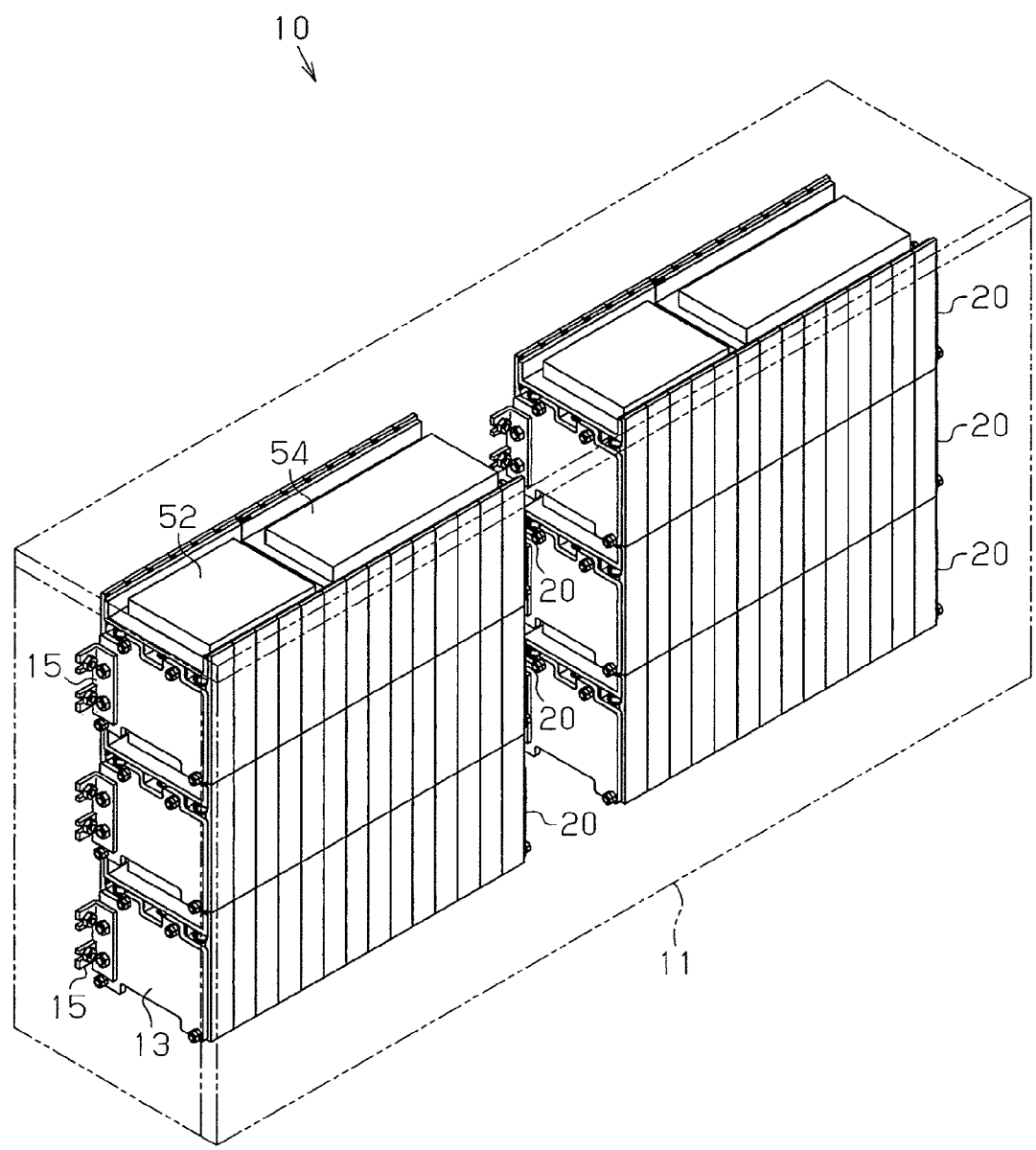
FIG. 1 is a perspective view showing one embodiment of a battery pack.

As shown in FIG. 1, a battery pack 10 includes a plurality of battery modules 20 accommodated in a housing 11. The battery pack 10 includes two sets of battery modules 20, with each set including three battery modules 20 stacked in a column in the vertical direction.

Figure 2:
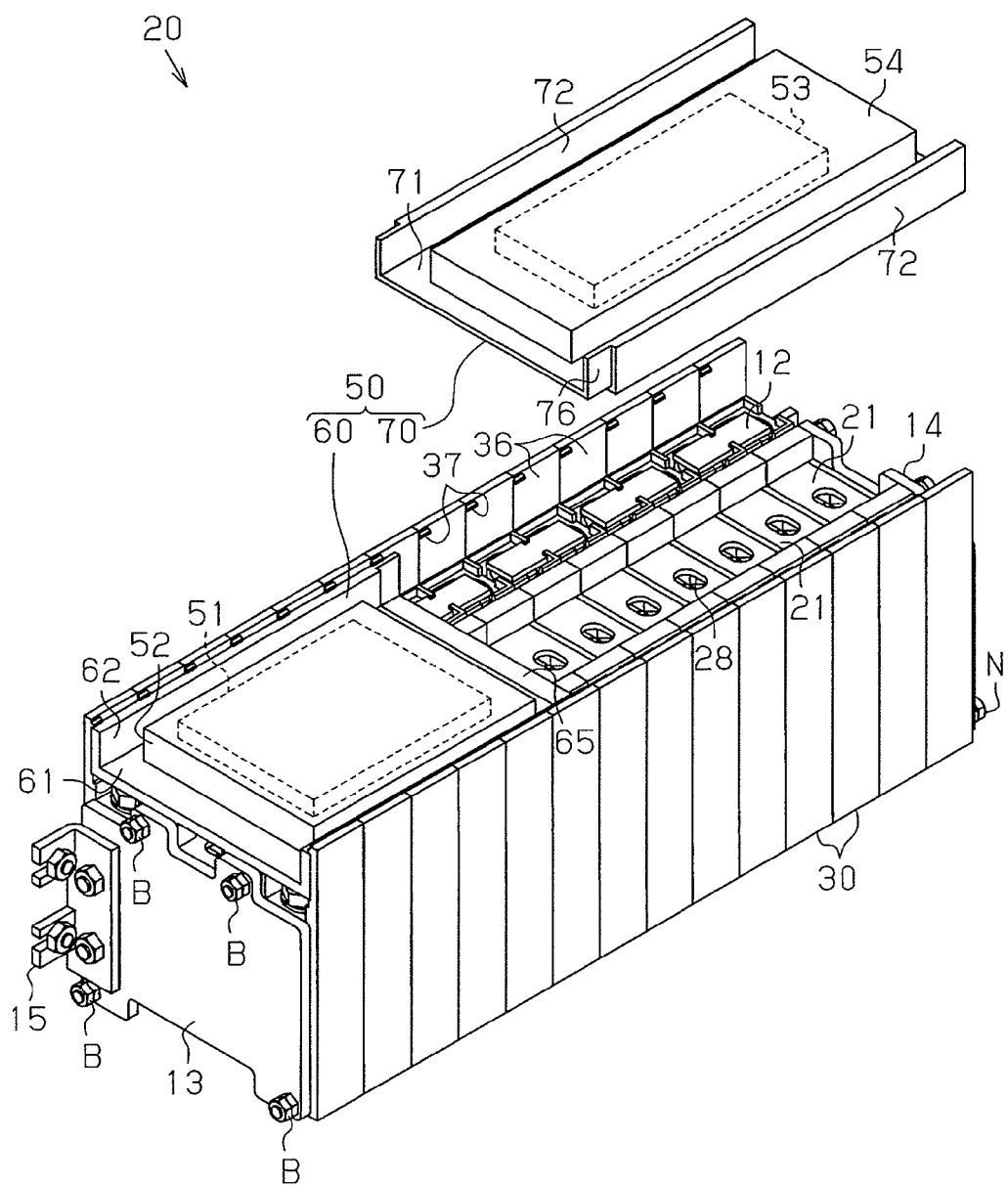
FIG. 2 is a perspective view showing a battery module included in the battery pack of FIG. 1.
Figure 3:
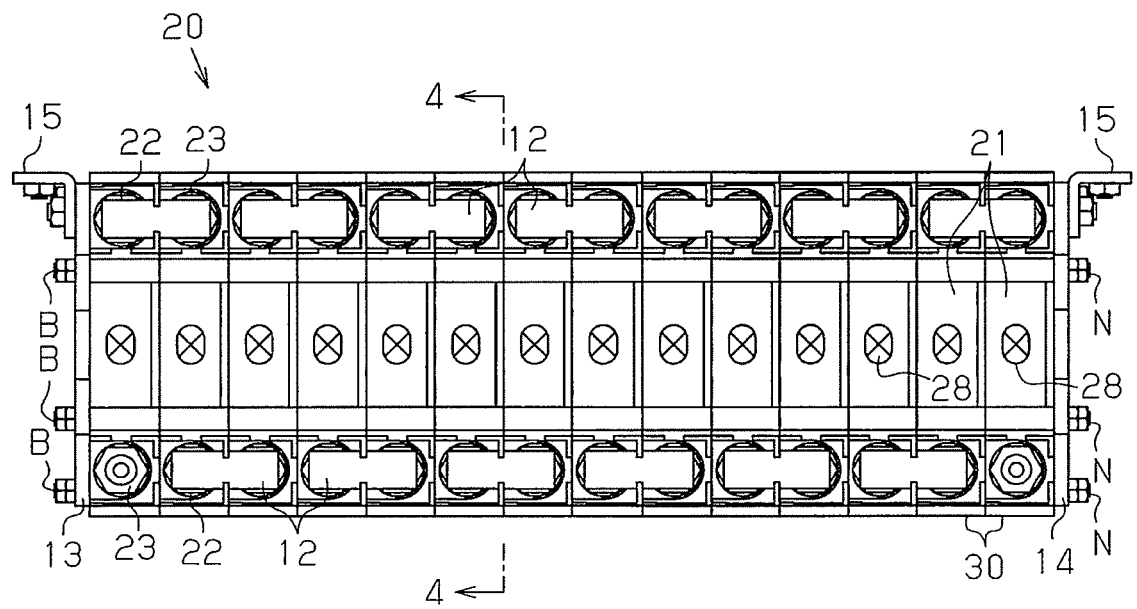
FIG. 3 is a plan view showing the battery module of FIG. 2 without a battery cover.

As shown in FIGS. 2 and 3, the battery module 20 includes prismatic batteries 21 that serve as rechargeable batteries and are arranged in the thickness-wise direction of the prismatic batteries 21. The prismatic batteries 21 are held by battery holders 30. Further, the prismatic batteries 21 and heat transmission plates 40 are alternately arranged side by side (refer to FIG. 6). Each prismatic battery 21 includes a positive terminal 22 and a negative terminal 23. The prismatic batteries 21 are arranged so that the positive terminals 22 are adjacent to the negative terminals 23 of adjacent prismatic batteries 21. The positive terminal 22 and the negative terminal 23 of adjacent prismatic batteries 21 are connected by a bus bar 12. Thus, the plurality of prismatic batteries 21 are connected in series.

End plates 13 and 14 are respectively arranged on the two ends of the prismatic batteries 21 in the direction the prismatic batteries 21 are laid out. Bolts B are inserted through the end plate 13 and fastened to nuts N at the outer side of the end plate 14. The prismatic batteries 21 and the heat transmission plates 40 are held between the end plates 13 and 14 and receive pressure in the layout direction of the prismatic batteries 21 from the end plates 13 and 14. The end plates 13 and 14 each include a bracket 15, which fixes the battery module 20 to the housing 11.

The battery module 20 includes a battery cover 50, which is arranged on one side of the prismatic batteries 21 in the height-wise direction (side corresponding to the side surfaces of the prismatic batteries 21 from which the positive terminal 22 and the negative terminal 23 project). The battery cover 50 includes two cover members that are adjacent in the layout direction of the prismatic batteries 21, namely, a first cover member 60 and a second cover member 70. The battery cover 50 includes a controller 51 (control circuit), which controls the prismatic batteries 21 and is covered by a controller cover 52. The battery cover 50 also includes an electronic component 53, which is adjacent to the controller 51 and used to charge and discharge the prismatic batteries 21. The electronic component 53 is covered by an electronic component cover 54.

Figure 4:
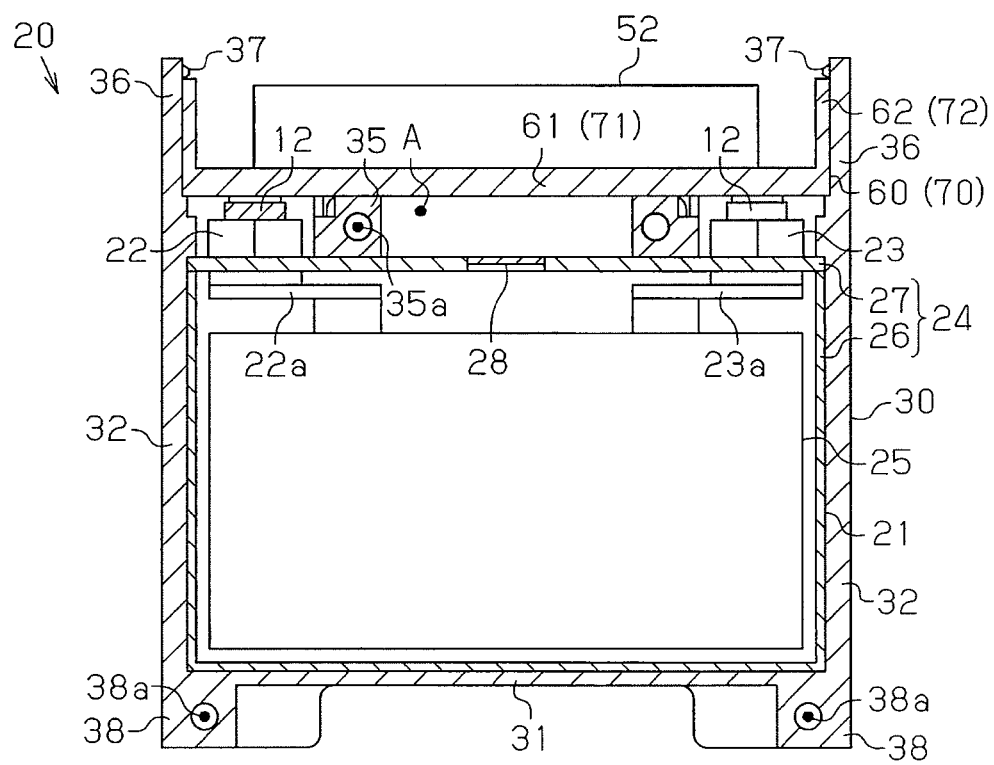
FIG. 4 is a cross-sectional view taken along line 4-4 in FIG. 3.

As shown in FIG. 4, the prismatic battery 21 includes a battery case 24 and an electrode assembly 25, which is accommodated in the battery case 24. The battery case 24 includes a body 26, which has the form of a tetragonal box and accommodates the electrode assembly 25, and a lid 27, which has the form of a tetragonal plate and closes an opening of the body 26. The lid 27 includes the positive terminal 22 and the negative terminal 23. The lid 27 also includes a release valve 28, which is torn and opens when the internal pressure of the battery case 24 increases to a threshold value. The threshold value is set to a pressure that tears the release valve 28 before the battery case 24 is damaged by the increased internal pressure of the battery case 24. The electrode assembly 25 includes a plurality of stacked positive and negative electrodes. The positive terminal 22 and the negative terminal 23 are each electrically connected to the electrode assembly 25 by a positive conductive member 22a and a negative conductive member 23a.

Figure 5:
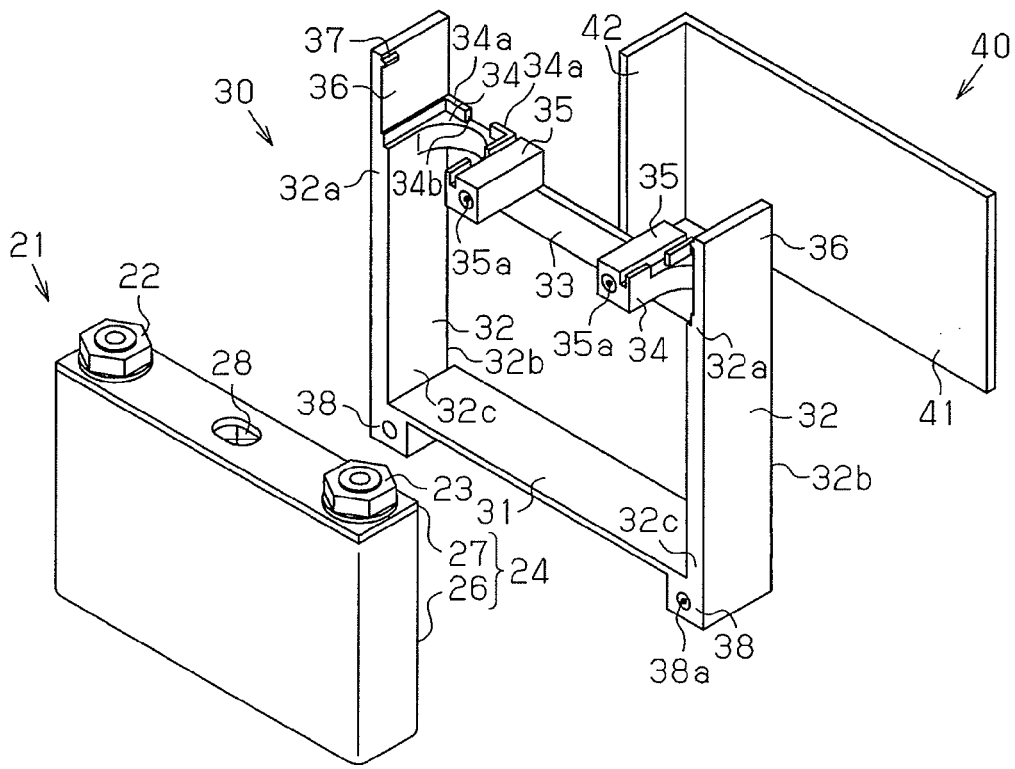
FIG. 5 is a perspective view showing the relationship of a prismatic battery, a battery holder, and a heat transmission plate.

As shown in FIG. 5, the battery holder 30 includes a first concealing portion 31, which has the form of a tetragonal plate. A second concealing portion 32, which has the form of a tetragonal plate and extends in the thickness-wise direction of the first concealing portion 31, is arranged on each of the two longitudinal ends of the first concealing portion 31. The second covers 32 each include a first longitudinal end 32a (end opposite to the end on which the first concealing portion 31 is arranged) and a first lateral end 32b. A third concealing portion 33 is arranged on the first longitudinal ends 32a of the second covers 32. The third concealing portion 33, which has the form of a tetragonal plate, extends between the first lateral ends 32b of the second covers 32. The thickness-wise direction of the third concealing portion 33 conforms to the lateral direction of the second covers 32. The longitudinal direction of the third concealing portion 33 conforms to the direction in which the second covers 32 are opposed to each other. The direction orthogonal to the thickness-wise direction and the longitudinal direction of the third concealing portion 33 is the lateral direction of the third concealing portion 33.

Terminal accommodation portions 34 are arranged on a lateral end surface of the third concealing portion 33 at the two longitudinal ends of the third concealing portion 33. Each terminal accommodation portion 34 is U-shaped and opens in the thickness-wise direction of the third concealing portion 33. Further, each terminal accommodation portion 34 is continuous with the corresponding second concealing portion 32.

Each terminal accommodation portion 34 includes a plate-shaped cover support 34a, which supports the battery cover 50 and projects from a surface opposite to the surface that contacts the third concealing portion 33. The cover support 34a includes a notch 34b.

Pillars 35, which have the form of square pillars, are arranged adjacent to the terminal accommodation portions 34 on one lateral end surface of the third concealing portion 33. The axes of the pillars 35 extend in the lateral direction of the second covers 32. An insertion hole 35a extends through each pillar 35 in the axial direction of the pillar 35. A bolt B is inserted through the insertion hole 35a.

A cover holding portion 36 is arranged on the first longitudinal end 32a of each second concealing portion 32. The cover holding portion 36 is continuous with the second concealing portion 32 and extends in the longitudinal direction of the second concealing portion 32. The cover holding portion 36 has the form of a tetragonal plate. The cover holding portion 36 includes an engagement tab 37, which engages the battery cover 50. A second longitudinal end 32c of each second concealing portion 32 includes a leg 38, which has the form of a square pillar. The axis of the leg 38 extends in the lateral direction of the second concealing portion 32. An insertion hole 38a extends through the leg 38 in the axial direction of the leg 38. A bolt B is inserted through the insertion hole 38a.

Each heat transmission plate 40 includes a body 41, which has the form of a tetragonal plate and is held between the prismatic batteries 21, and a heat dissipating portion 42, which extends from one longitudinal end of the body 41 in the thickness-wise direction of the body 41.

Figure 7A:
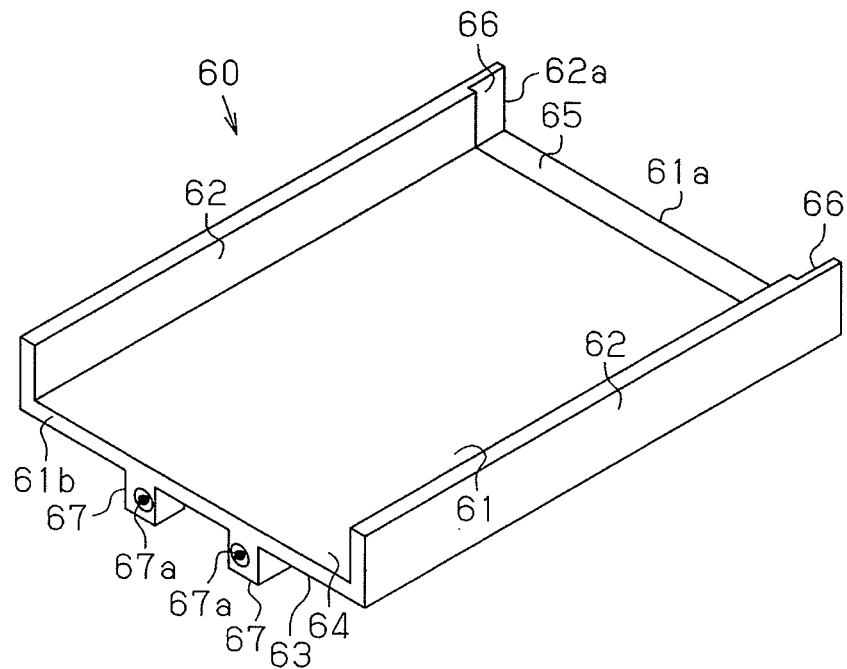
FIGS. 7A and 7B are perspective views each showing a first cover member.
Figure 7B:
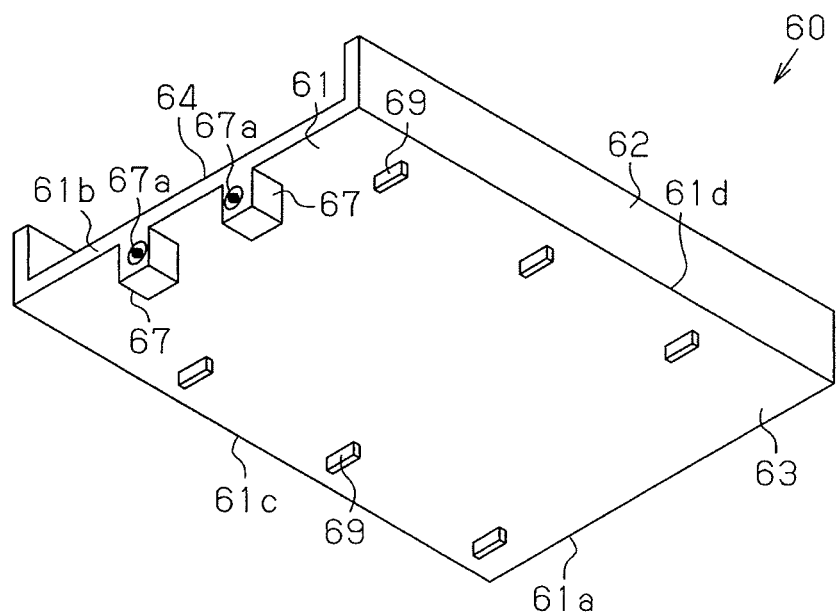

As shown in FIGS. 7A and 7B, the first cover member 60 includes a first body 61, which has the form of a tetragonal plate, and first extensions 62, which have the form of a tetragonal plate and respectively extend from the two lateral ends of the first body 61 in the thickness-wise direction of the first body 61. The longitudinal direction of the first body 61 is the same as the longitudinal direction of the first extensions 62. The lateral direction of the first body 61 extends in the thickness-wise direction of the first extensions 62. The lateral direction of the first extensions 62 extends in the thickness-wise direction of the first body 61. In the following description, the surface on which the first extensions 62 of the first body 61 are arranged is referred to as the first inner surface 64, and the surface opposite to the first inner surface 64 is referred to as the first outer surface 63. The first outer surface 63 may be referred to as the first surface and the first inner surface 64 may be referred to as the second surface.

The first body 61 includes a first longitudinal end 61a. The first longitudinal end 61a includes a first thin portion 65, which is recessed from the first inner surface 64 toward the first outer surface 63. Each first extension 62 includes a first longitudinal end 62a (end corresponding to the first longitudinal end 61a of the first body 61). The first longitudinal end 62a includes a thin portion 66, which is recessed in the thickness-wise direction of the first extension 62 and continuous with the first thin portion 65.

The first body 61 includes a second longitudinal end 61b. Two box-shaped bolt fastening portions 67 project from the first outer surface 63 at the second longitudinal end 61b. Each bolt fastening portion 67 includes an insertion hole 67a, which extends in the longitudinal direction of the first body 61. A bolt B is inserted through the insertion hole 67a. In the battery module 20, the bolt fastening portions 67 are opposed to the pillars 35 of the battery holders 30, and the insertion holes 67a of the bolt fastening portions 67 are in communication with the insertion holes 35a of the battery holders 30. The first outer surface 63 includes a first lateral end 61c and a second lateral end 61d. Projections 69, which are arranged in intervals, project from the first outer surface 63 at the first lateral end 61c and the second lateral end 61d. The projections 69 of the first lateral end 61c and the second lateral end 61d are alternately arranged so that the projections 69 of the first lateral end 61c are not opposed to the projections 69 of the second lateral end 61d in the lateral direction of the first body 61.

The second cover member 70 is identical in form to the first cover member 60 except for the thin portion. The second cover member 70 will now be described in detail below.

Figure 8A:
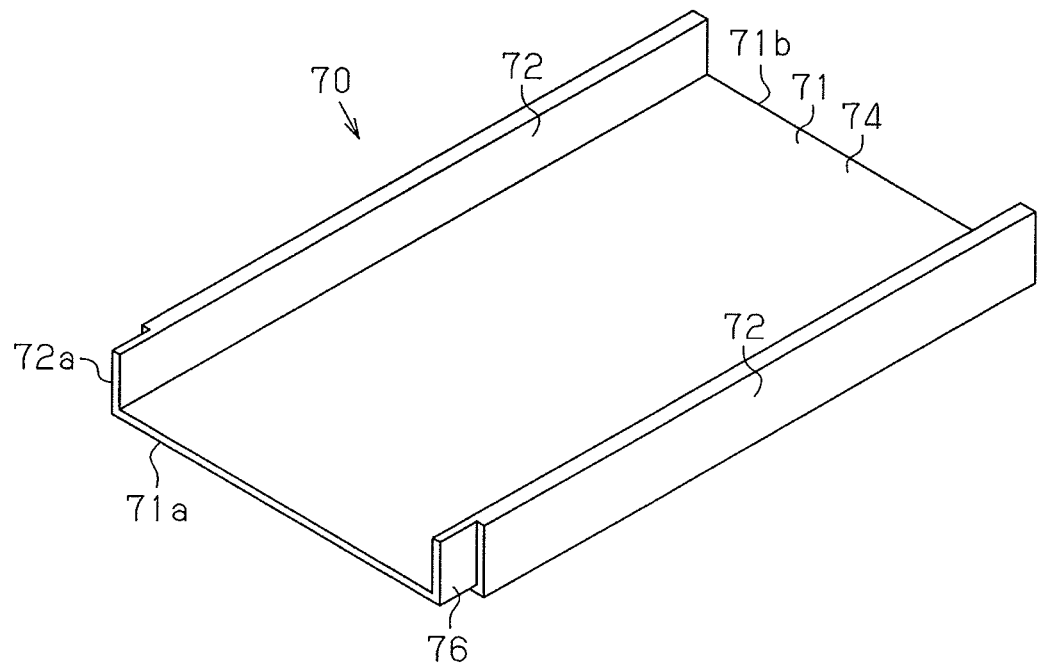
FIGS. 8A and 8B are perspective views each showing a second cover member.
Figure 8B:
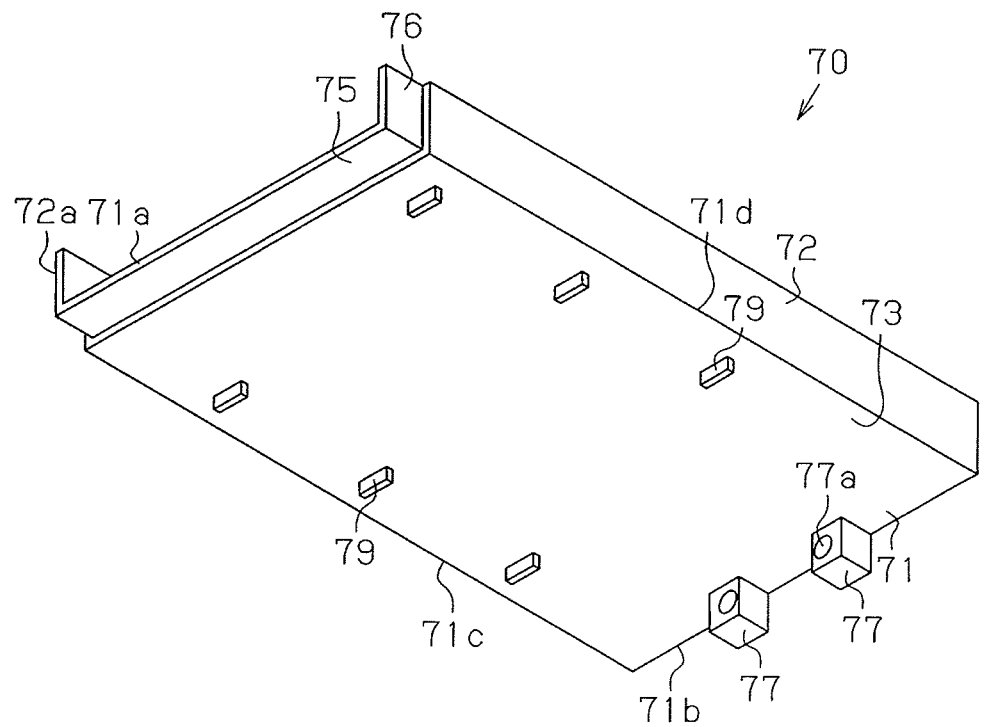

As shown in FIGS. 8A and 8B, the second cover member 70 includes a second body 71, which has the form of a tetragonal plate, and second extensions 72, which have the form of a tetragonal plate and respectively extend from the two lateral ends of the second body 71 in the thickness-wise direction of the second body 71. The longitudinal direction of the second body 71 is the same as the longitudinal direction of the second extensions 72. The lateral direction of the second body 71 extends in the thickness-wise direction of the second extensions 72. The lateral direction of the second extensions 72 extends in the thickness-wise direction of the second body 71. In the following description, the surface on which the second extensions 72 of the second body 71 are arranged is referred to as the second inner surface 74, and the surface opposite to the second inner surface 74 is referred to as the second outer surface 73. The second outer surface 73 may be referred to as the third surface and the second inner surface 74 may be referred to as the fourth surface.

The second body 71 includes a first longitudinal end 71a. The first longitudinal end 71a includes a second thin portion 75, which is recessed toward the second inner surface 74. Each second extension 72 includes a first longitudinal end 72a (end corresponding to the first longitudinal end 71a of the second body 71). The first longitudinal end 72a includes a thin portion 76, which is recessed in the thickness-wise direction of the second extension 72 and continuous with the second thin portion 75.

The second body 71 includes a second longitudinal end 71b. Two box-shaped bolt fastening portions 77 project from the second outer surface 73 at the second longitudinal end 71b. Each bolt fastening portion 77 includes an insertion hole 77a, which extends in the longitudinal direction of the second body 71. A bolt B is inserted through the insertion hole 77a. The second outer surface 73 includes a first lateral end 71c and a second lateral end 71d. Projections 79, which are arranged in intervals, project from the second outer surface 73 at the first lateral end 71c and the second lateral end 71d. The projections 79 of the first lateral end 71c and the second lateral end 71d are alternately arranged so that the projections 79 of the first lateral end 71c are not opposed to the projections 79 of the second lateral end 71d in the lateral direction of the second body 71.

Figure 6:
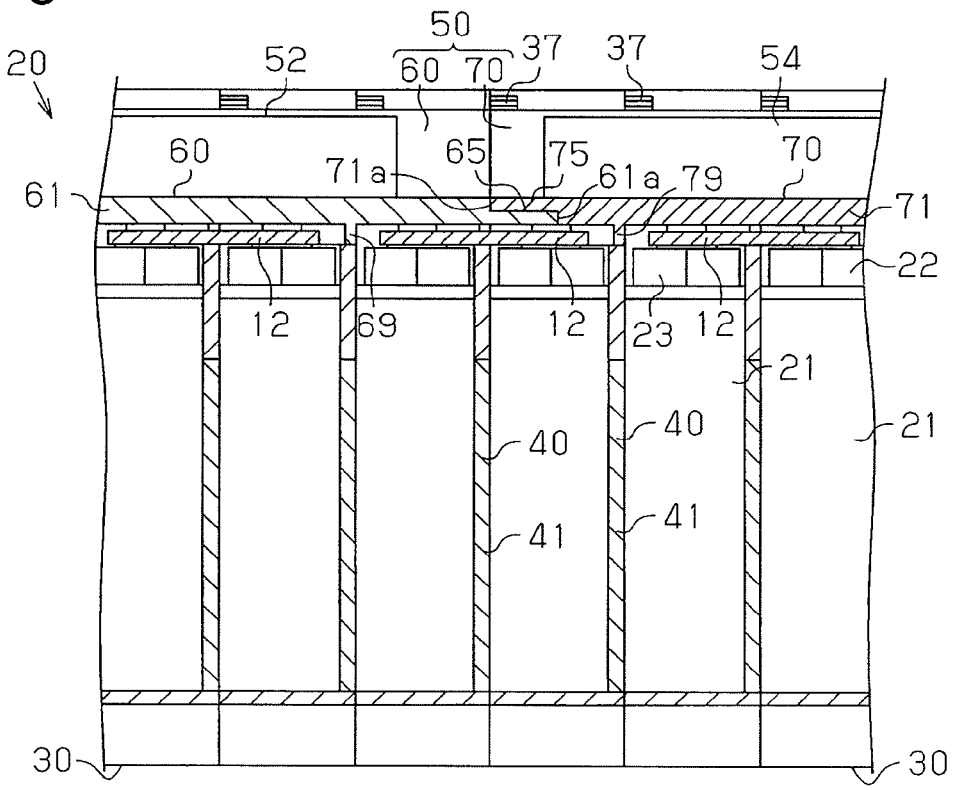
FIG. 6 is a partially enlarged cross-sectional view of the battery module shown in FIG. 2.

As shown in FIG. 6, the battery cover 50 is formed so that the first thin portion 65 in the first longitudinal end 61a of the first cover member 60 overlaps the second thin portion 75 in the first longitudinal end 71a of the second cover member 70 in the vertical direction. More specifically, the first cover member 60 includes a first edge opposed to the second cover member 70 on the first longitudinal end 61a, and the second cover member 70 includes a second edge opposed to the first cover member 60 on the first longitudinal end 71a. The first edge and the second edge overlap with each other so that the first edge is opposed to the second edge in the thickness-wise direction of the battery cover 50.

The first outer surface 63 of the first cover member 60 is opposed to the lids 27, that is, the walls on which the release valves 28 of the battery cases 24 are arranged. In the same manner, the second outer surface 73 of the second cover member 70 is opposed to the lids 27. Thus, the opposing surfaces of the battery cover 50 opposed to the lids 27 are the first outer surface 63 (first surface) and the second outer surface 73 (third surface). The battery cover 50 is mounted on the battery holders 30 (cover supports 34a and pillars 35). The distal ends of the first extensions 62 and the second extensions 72 (ends of first extensions 62 and second extensions 72 opposite to ends where first body 61 and second body 71 are arranged) engage the engagement tabs 37. This fixes the first cover member 60 and the second cover member 70 to the battery holders 30. The projections 69 and 79 arranged on the first cover member 60 and the second cover member 70 are fitted between the bus bars 12. This maintains insulation between the adjacent bus bars 12.

As shown in FIG. 4, a region A located between the lid 27 and the first and second bodies 61 and 71 is opposed to the release valves 28. The region A extends in the layout direction of the prismatic batteries 21. The end plates 13 and 14 are arranged at the two ends in the layout direction of the prismatic batteries 21. However, a gap is formed between the end plate 13 and the first cover member 60 and between the end plate 14 and the second cover member 70. Thus, the region A is not closed. The region A functions as a gas releasing passage through which the gas emitted from the prismatic battery 21 flows.

The operation of the battery module 20 of the present embodiment will now be described.

In the battery module 20, manufacturing errors in the battery holder 30, the heat transmission plate 40, and the prismatic battery 21 may result in dimensional errors between the prismatic batteries 21 in the layout direction. Further, when the end plates 13 and 14 apply pressure to the prismatic batteries 21 and the heat transmission plates 40 like in the battery module 20 of the present embodiment, a constant load is applied to the prismatic batteries 21 and the heat transmission plates 40. This may also result in dimensional errors between the prismatic batteries 21 in the layout direction in the battery module 20 depending on how load is applied.

When the dimensional error of the prismatic batteries 21 in the layout direction increases in the battery module 20, the battery cover 50 may not be located above the release valves 28 of some of the prismatic batteries 21 if the battery cover 50 is formed by a single member. Under this situation, when high-temperature gas (emission) is emitted from the release valve 28 of a prismatic battery 21, the high-temperature gas would strike another battery module 20 located at the upper side in the vertical direction.

In the battery module 20 of the present embodiment, when the battery module 20 includes a dimensional error in the layout direction of the prismatic batteries 21, the first cover member 60 is moved in a direction extending from the first longitudinal end 61a toward the second longitudinal end 61b. Alternatively, the second cover member 70 is moved in a direction extending from the first longitudinal end 71a toward the second longitudinal end 71b. This reduces the overlapping amount of the first thin portion 65 and the second thin portion 75. Thus, the overall length of the battery cover 50 is adjusted by the overlapping amount of the first cover member 60 and the second cover member 70.

When high-temperature gas is emitted from a prismatic battery 21, the battery cover 50 limits the diffusion of the gas. Thus, the high-temperature gas does not easily strike the battery module 20 located at the upper side in the vertical direction. The overall length of the battery cover 50 is adjusted by the overlapping amount of the first cover member 60 and the second cover member 70. This avoids a situation in which the battery cover 50 cannot be arranged above the release valves 28 of some of the prismatic batteries 21 and limits the striking of gas emitted from the release valve 28 of a prismatic battery 21 against a battery module 20. The direction in which gas is emitted can be restricted by closing the gap between the end plate 13 and the first cover member 60 or the gap between the end plate 14 and the second cover member 70. In the present embodiment, for example, the end plate 14 is adjacent to another battery module 20. Thus, the gap between the end plate 14 and the second cover member 70 may be closed so that gas is not emitted toward the adjacent battery module 20.

Even when conductive substances such as electrolyte solution are emitted from the release valve 28 of a prismatic battery 21, the battery cover 50 is able to limit the diffusion of the emissions.

The above embodiment has the advantages described below.

(1) The battery cover 50 is formed by the first cover member 60 and the second cover member 70. The first cover member 60 includes the first thin portion 65, and the second cover member 70 includes the second thin portion 75. The second thin portion 75 of the second cover member 70 is overlapped with the first thin portion 65 of the first cover member 60. If the battery module 20 includes a dimensional error in the layout direction of the prismatic batteries 21, the first cover member 60 or the second cover member 70 is moved to adjust the overlapping amount of the first thin portion 65 and the second thin portion 75 when manufacturing the battery module 20. This adjusts the overall length of the battery cover 50. Thus, the battery cover 50 limits the formation of gaps. This reduces the leakage of emissions from the release valve 28 of a prismatic battery 21 through the gaps of the battery cover 50. Accordingly, the diffusion of emissions from the prismatic battery 21 is limited. This also limits a situation in which the high-temperature gas emitted from the release valve 28 of each prismatic battery 21 strikes the battery module 20. Further, the heating of the battery module 20 is limited. Thus, temperature differences between the prismatic battery 21 are limited in the battery modules 20, and the shortening of the duration of the battery modules 20 is limited that would be caused by overheating of the prismatic batteries 21.

(2) The first cover member 60 includes the first thin portion 65, and the second cover member 70 includes the second thin portion 75. Thus, the unevenness of the battery cover 50 can be reduced by overlapping the first thin portion 65 with the second thin portion 75. This improves the assembling efficiency of the battery cover 50.

(3) The battery cover 50 is fixed to the battery holders 30. Thus, even when the battery module 20 is vibrated, displacement of the battery cover 50 is limited. This improves the vibration resistance. Thus, changes in the overlapping amount of the first cover member 60 and the second cover member 70 caused by vibration are limited after manufacturing the battery module 20. This also limits separation of the battery cover 50 from the battery module 20.

(4) The projections 69 and 79 of the first cover member 60 and the second cover member 70 are arranged between the adjacent bus bars 12. This maintains the insulation between the adjacent bus bars 12 and limits short-circuiting between the prismatic batteries 21.

(5) The region above the battery cover 50 may be used as space for the controller 51.

The embodiment may be modified as follows.

The battery cover 50 may be formed by three or more covers.

The first cover member 60 and the second cover member 70 may be overlapped with the dimension in the lateral direction of the first body 61 of the first cover member 60 (or the second cover member 70) set to be shorter than the dimension (inner dimension) of the opposing direction of the second extensions 72 of the second cover member 70 (or the first cover member 60), and without the thin portions. The first cover member 60 may be fitted between the opposing second extensions 72 of the second cover member 70 so that the first cover member 60 overlaps the second cover member 70. The edge of the first cover member 60 opposed to the second cover member 70 may include a projection extending in the entire lateral direction of the first body 61 and projecting in the longitudinal direction of the first body 61. The edge of the second cover member 70 opposed to the first cover member 60 may include a recess that receives the projection. The overlapping amount of the first cover member 60 and the second cover member 70 may be adjusted by adjusting the received amount of the projection of the first cover member 60.

The battery cover 50 may be fixed to a member other than the battery holder 30. For example, the battery cover 50 may be fixed to the end plates 13 and 14.

The first cover member 60 and the second cover member 70 do not have to include the projections 69 and 79. In this case, it is preferred that the insulation between the adjacent bus bars 12 be ensured without using the projections 69 and 79.

The controller 51 and the electronic component 53 may be arranged at a location other than on the battery cover 50 (for example, inside or outside the housing 11).

A laminated battery or a cylindrical battery may be used as the rechargeable battery.

The first cover member 60 may be formed only by the first body 61, and the second cover member 70 may be formed only by the second body 71. In this case, it is preferred that the first body 61 and the second body 71 be fixed to the battery module 20.

A seal may be arranged between the first thin portion 65 and the second thin portion 75.

Three battery modules 20 are stacked in the embodiment. However, the number of battery modules 20 may be changed. Further, there may be only one battery module 20.

What is claimed is:

1. A battery module comprising:
a plurality of rechargeable batteries arranged side by side, wherein each of the rechargeable batteries includes a battery case, and the battery case includes a wall having a release valve configured to open when an internal pressure of the battery case increases to a threshold value; and
a battery cover opposed to the wall of at least one of the rechargeable batteries such that the battery cover covers the release valve of the at least one rechargeable battery to reduce the leakage of emissions from the at least one rechargeable battery through the battery cover, wherein:
the battery cover includes a plurality of cover members arranged side by side in a layout direction of the plurality of rechargeable batteries;
the plurality of cover members include at least a first cover member and a second cover member that are adjacent to each other;
the first cover member includes a first edge; and
the second cover member includes a second edge that overlaps the first edge.

2. The battery module according to claim 1, wherein:
the first edge includes a longitudinal end of the first cover member, wherein the longitudinal end of the first cover member has a reduced cross-sectional thickness relative to a cross-sectional thickness of the first cover member disposed adjacent to the longitudinal end of the first cover member;
the second edge includes a longitudinal end of the second cover member, wherein the longitudinal end of the second cover member has a reduced cross-sectional thickness relative to a cross-sectional thickness of the second cover member disposed adjacent to the longitudinal end of the second cover member; and
the longitudinal end of the first cover member overlaps the longitudinal end of the second cover member.

3. The battery module according to claim 1, further comprising a plurality of battery holders that respectively hold the rechargeable batteries,
wherein the battery cover is fixed to the battery holders.

4. The battery module according to claim 1, wherein:
adjacent ones of the rechargeable batteries are connected by a bus bar;
the battery cover includes an opposing surface opposed to the wall of the battery case;
the battery cover includes a projection that projects from the opposing surface toward the wall of the battery case; and
the projection is arranged between adjacent ones of the bus bars.

5. The battery module according to claim 1, wherein:
the battery cover includes an opposing surface opposed to the wall of the battery case; and
a controller that controls the rechargeable batteries is arranged on a surface opposite to the opposing surface.

6. The battery module according to claim 1, wherein:
the first cover member includes a first body and at least one first extension that extends from a lateral end of the first body in a vertical direction that is perpendicular to the layout direction, wherein the first edge includes longitudinal ends of the first body and the at least one first extension, and a longitudinal end of the first cover member, including the longitudinal ends of the first body and the at least one first extension, has a reduced cross-sectional thickness relative to a cross-sectional thickness of the first cover member disposed adjacent to the longitudinal end of the first cover member;
the second cover member includes a second body and at least one second extension that extends from a lateral end of the second body in the vertical direction, wherein the second edge includes longitudinal ends of the second body and the at least one second extension, and a longitudinal end of the second cover member, including the longitudinal ends of the second body and the at least one second extension, has a reduced cross-sectional thickness relative to a cross-sectional thickness of the second cover member disposed adjacent to the longitudinal end of the second cover member; and
the longitudinal end of the first cover member overlaps the longitudinal end of the second cover member.

* * * * *